F. F. & M. S. JACOBS.
HORSESHOE ICE CREEPER.
APPLICATION FILED MAR. 17, 1913.
1,081,449.
Patented Dec. 16, 1913.
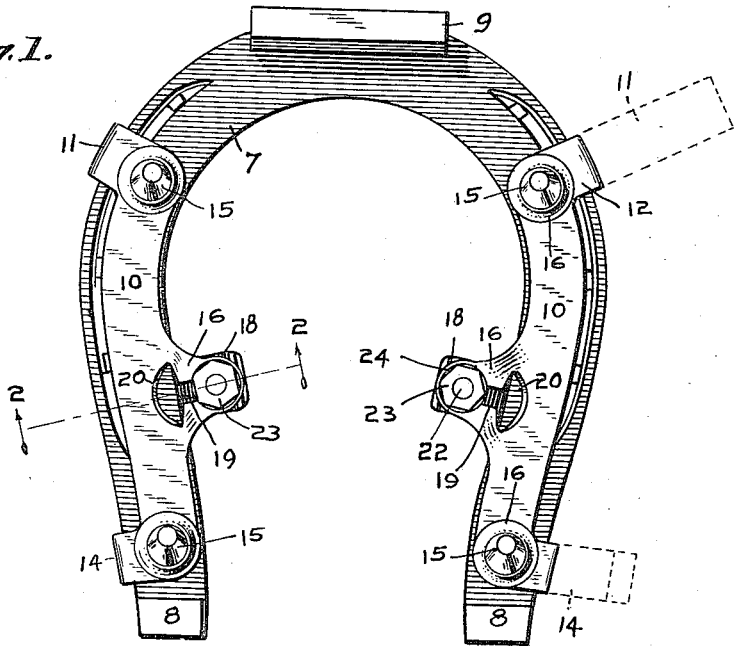
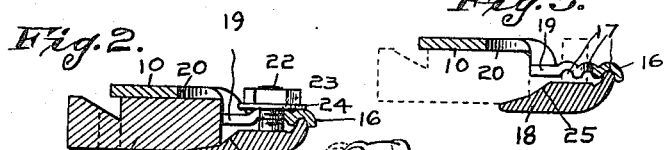
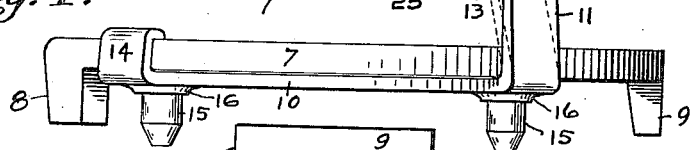
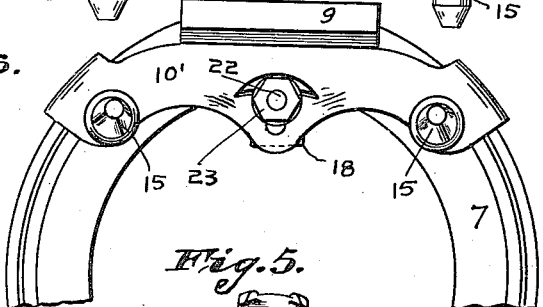
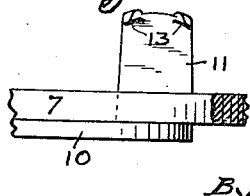
WITNESSES:
L. B. Woerner.
I. L. Larson
INVENTORS,
FRANK F. JACOBS AND
MINNIE S. JACOBS,
By Minturn & Woerner
Attorneys.

UNITED STATES PATENT OFFICE.

FRANK F. JACOBS AND MINNIE S. JACOBS, OF INDIANAPOLIS, INDIANA.

HORSESHOE ICE-CREEPER.

1,081,449.

Specification of Letters Patent.   Patented Dec. 16, 1913.

Application filed March 17, 1913.  Serial No. 754,903.

*To all whom it may concern:*

Be it known that we, FRANK F. JACOBS and MINNIE S. JACOBS, citizens of the United States, residing at Indianapolis, in the county of Marion and State of Indiana, have invented certain new and useful Improvements in Horseshoe Ice-Creepers, of which the following is a specification.

This invention relates to improvements in means for applying sharp calks to horseshoes upon short notice, for use in slippery weather, and capable of being applied and renewed by inexperienced persons.

The object of the invention is to supply a clamp the parts of which are drawn together by a bolt and nut, and which will automatically tighten the clamp to the horseshoe by the tightening of the nut upon the bolt.

We accomplish the above and other objects of the invention which will be hereinafter specifically pointed out and claimed, by the mechanism illustrated in the accompanying drawing, in which—

Figure 1 is an underside plan view of a horseshoe with our invention applied in operative position to both sides of the shoe. Fig. 2 is a cross section on the line 2—2 of Fig. 1. Fig. 3 is a like cross section showing the outline of the horseshoe in dotted lines. Fig. 4 is a side elevation or edge view of the shoe shown in Fig. 1, detached from the animal's hoof. Fig. 5 is an inside view of the hoof clip showing the two upper end barbs, and Fig. 6 is an underside or plan view of the front end of a horseshoe with our invention modified from that shown in the other figures so as to secure the front calks for both sides of the shoe by the means of a single plate.

Like characters of reference indicate like parts throughout the several views of the drawing.

The horseshoe 7 is of any usual and suitable shape and size and is here shown as provided with heel calks 8 and a toe calk 9, but these calks may or may not be on the shoes used with our invention.

10 are metal plates, preferably stamped out of sheet steel, the major portions of which are flat and contact with the lower face of the shoe 7, and follow the general contour of the shoe at those parts of the latter where the plates are to be used. The front end of the plate 10 is extended laterally and outwardly, and a short distance from the body of the plate this extension is bent upwardly to form the hoof clip 11 and its base 12. The upper end of the hoof clip 11 is formed with a pair of inwardly extending barbs 13 (see Fig. 5), and after the plate 10 is securely clamped to the shoe in the manner hereinafter to be described, the hoof clip 11 is bent over against the hoof of the animal with the barbs 13 gripping the hoof by being driven into it. At the rear end of the plate 10 is an outward lateral extension which is also bent upwardly a short distance from the plate 10, and then inwardly to form a hook-shaped clamp 14 which terminates against the top of the shoe, as shown in Fig. 4. This hook-shaped clip 14 is close to the heel calk 8 and back of the animal's hoof at the heel where there is sufficient room without contacting the heel of the animal.

15 are removable calks, here shown as round in cross section, and having tapered outer ends and flanged inner ends. The plates 10 are provided with suitable perforations near their ends for the insertion therethrough of the calks 15. The metal of the plate will preferably be swaged outwardly to form the lips 16 and countersinks in the inner faces of the plates 10 to receive the flanged ends of the calks. These calks are thus readily removable for easy and quick renewal when dulled by use.

Formed on the inner edge of each plate 10 approximately midway between the end calks 15 is a lip 16 which is corrugated, as shown in Fig. 3, to provide notches 17 to engage the hooked end of a clamping plate 18. The lip 16 is provided with a bolt slot 19 substantially at right angles to the body plate 10, and terminating at its inner end in a larger perforation 20 of sufficient size for the passage therethrough of a bolt head and also of such size as to expose a sufficient portion of the horseshoe 7 through it to provide a bearing of a washer or nut thereon when necessary or desirable as where our improved device is used on the shoes of heavy work horses traveling over rough pavements, under which conditions a solid bearing of the nut against the shoe is desirable. The body of the lip 16 is in a plane closer to the horse's foot than is the outer face of the plate 10, by a distance approximately equal to the thickness of a nut in order that the nut when applied as hereinafter specified will be above the surface plate 10 and thereby protected from impact with the road.

The clamping plate 18 is secured to the lip 16 of the plate 10 by means of a bolt 22, the threaded end of which passes through the slot 19 and is secured by a nut 23.

24 is a washer of any of the well known plain or lock-nut types, but which may be entirely omitted if desired.

The bolt 22 may be an integral portion of the clamping plate 18 or it may pass through a perforation of the latter and therefore be removably secured to it. The outer hooked end of the clamping plate 18 is adapted to enter one of the notches 17 of the lip 16, depending upon the shape and size of the horseshoe 7 to which our device is being fitted, the several notches 17 and the bolt slot 19 permitting the clamping plate to be moved toward or from the edge of the shoe 7 to suit the conditions. The inner end of the clamping plate 18 is beveled, as shown at 25 to contact with the edge of the shoe 7 and by the oblique shape 25 cause the clamping plate to move away from the shoe and by so doing to carry the plate 10 with it on account of the engagement of the hooked end of the clamping plate in notch 17 of the plate 10. This movement of the plate 10 inwardly of the shoe 7 draws its clips 11 and 14 tight against the outer edge of the shoe thereby clamping the plate 10 securely to the shoe.

In the modification shown in Fig. 6, both of the calks 15 in front of the shoe are secured by means of a single plate 10′ which is attached by a clamping plate 18 and bolt 22 and nut 23, in the same manner as has been already described for the side plates 10. In this modification the nut 23 is shown as having a bearing directly against the shoe 7 which is obtained by moving the bolt inwardly of the slot.

Having thus fully described our invention, what we claim as new and wish to secure by Letters Patent of the United States, is—

1. The combination with a horseshoe of a calk-bearing plate having upwardly bent portions to engage the outer edge of a shoe, and having a lip projecting from its inner edge, said lip being slotted and bent above the face of the shoe and having a plurality of notches at different distances from the shoe, and a clamping plate bolted to the lip having a hook at one end to engage one of the notches in the lip, the other end of the clamping plate contacting the shoe and having an oblique portion near said last end to contact with the upper edge of the shoe.

2. The combination with a horseshoe of a calk-bearing plate having upwardly bent portions to engage the outer edge of the shoe and having a lip projecting from its inner edge, said lip being slotted and bent above the face of the shoe and having notches, the front one of said upwardly bent portions being extended up against the hoof and terminating with barbs to be driven into the hoof, and a clamping plate bolted to the lip having a hook at one end to engage a notch in the lip and having an oblique opposite end to contact with the shoe and an adjacent more oblique portion to contact with the upper edge of the shoe to cause the plate to be drawn in the direction of the lip to tighten the upward bent portions against the outer edge of the shoe.

In witness whereof, we have hereunto set our hands and seals at Indianapolis, Indiana, this fourth day of March, A. D. one thousand nine hundred and thirteen.

FRANK F. JACOBS. [L. S.]
MINNIE S. JACOBS. [L. S.]

Witnesses:
J. FRANK YOUNG,
I. L. LARSON.

---

Copies of this patent may be obtained for five cents each, by addressing the "Commissioner of Patents, Washington, D. C."